US012806760B2

(12) United States Patent
Isobe

(10) Patent No.: US 12,806,760 B2
(45) **Date of Patent: *Nov. 24, 2026**

(54) PARALLEL LINK MECHANISM AND LINK OPERATION DEVICE

(71) Applicant: NTN CORPORATION, Osaka (JP)

(72) Inventor: Hiroshi Isobe, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/265,648

(22) Filed: Jul. 10, 2025

(65) Prior Publication Data

US 2025/0339955 A1 Nov. 6, 2025

Related U.S. Application Data

(63) Continuation of application No. 18/609,183, filed on Mar. 19, 2024, now Pat. No. 12,384,018, which is a continuation of application No. PCT/JP2022/034968, filed on Sep. 20, 2022.

(30) Foreign Application Priority Data

Sep. 28, 2021 (JP) ................................ 2021-158340

(51) Int. Cl.
*B25J 9/10* (2006.01)
*B25J 9/00* (2006.01)

(52) U.S. Cl.
CPC ............ *B25J 9/0045* (2013.01); *B25J 9/101* (2013.01)

(58) Field of Classification Search
CPC ................................ B25J 9/0045; B25J 9/101
See application file for complete search history.

(56) References Cited

U.S. PATENT DOCUMENTS 5,893,296 A 4/1999 Rosheim
9,522,469 B2 12/2016 Isobe et al.
12,384,018 B2 * 8/2025 Isobe .................... B25J 9/0045
(Continued)

FOREIGN PATENT DOCUMENTS

JP 11-104987 4/1999
JP 2000-94245 4/2000
(Continued)

OTHER PUBLICATIONS

U.S. Office Action for U.S. Appl. No. 18/609,183 dated Jan. 13, 2025.
(Continued)

*Primary Examiner* — William C Joyce

(57) ABSTRACT

In a parallel link mechanism, a distal end side link hub is coupled to a proximal end side link hub via three link mechanisms such that a posture of the distal end side link hub can be changed. Each link mechanism includes a proximal side end link member, a distal side end link member, and a center link member, and forms a quadric chain link mechanism composed of four revolute pairs. A singular point occurs when a central axis of the proximal or distal end side link hub and a central axis which is a rotation axis of a revolute pair section of the proximal or distal side end link member and the center link member coincide with each other. An axis angle of the center link member is specified such that a posture in which the singular point occurs is avoided.

4 Claims, 13 Drawing Sheets

(56) References Cited

U.S. PATENT DOCUMENTS

| | | | |
|---|---|---|---|
| 2015/0088308 | A1 | 3/2015 | Isobe et al. |
| 2019/0047159 | A1 | 2/2019 | Isobe et al. |

FOREIGN PATENT DOCUMENTS

| | | |
|---|---|---|
| JP | 2013-202725 | 10/2013 |
| JP | 2016-112638 | 6/2016 |

OTHER PUBLICATIONS

Interview Summary for U.S. Appl. No. 18/609,183 dated Apr. 1, 2025.

Notice of Allowance for U.S. Appl. No. 18/609,183 dated Apr. 24, 2025.

U.S. Appl. No. 18/609,183, filed Mar. 19, 2024, Hiroshi Isobe, NTN Corporation.

* cited by examiner

PARALLEL LINK MECHANISM AND LINK OPERATION DEVICE

CROSS REFERENCE TO THE RELATED APPLICATION

This application is a continuation application of U.S. patent application Ser. No. 18/609,183, filed Mar. 19, 2024, which is a continuation application, under 35 U.S.C. § 111(a) of international patent application No. PCT/JP2022/034968, filed Sep. 20, 2022, which claims priority to Japanese patent application No. 2021-158340, filed Sep. 28, 2021, the entire disclosures of all are herein incorporated by reference as a part of this application.

BACKGROUND OF THE INVENTION

Field of the Invention

The present invention relates to a parallel link mechanism and a link actuating device to be used, for example, in equipment that requires high speed, high precision, and a wide operating range such as medical equipment and industrial equipment such as automatic deburring machines.

Description of Related Art

Patent Document 1 discloses a work device that performs predetermined work by a parallel link mechanism that includes a base plate and a traveling plate, couples these plates by a plurality of links, and moves the traveling plate by coordinated operation of these links.

Patent Document 2 discloses a link actuating device that is compact but capable of operating at high speed and high precision over a wide operating range.

RELATED DOCUMENT

Patent Document

[Patent Document 1] JP Laid-open Patent Publication No. 2000-094245

[Patent Document 2] U.S. Pat. No. 5,893,296

In the parallel link mechanism of Patent Document 1, the operating angle of each link is small. Therefore, it is necessary to increase the link length in order to set the operating range of the travelling plate to be large. Accordingly, the dimensions of the entire mechanism are increased, and the size of the device is increased. In addition, when the link length is increased, the rigidity of the entire mechanism may be reduced. Therefore, the weight of a tool to be mounted on the travelling plate, that is, the weight capacity of the travelling plate, is also limited to a small value.

In the configuration of the parallel link mechanism and link actuating device shown in Patent Document 2, the singular point of the parallel link mechanism is not clear, and without analysis using a 3D model or confirmation using an actual machine, it is not known whether a singular point exists in the operation range of the parallel link mechanism and the link actuating device. Therefore, a movement range that is equivalent to a maximum bending angle of 90° or larger and that is wider than the movement range established by experience cannot be achieved.

SUMMARY OF THE INVENTION

An object of the present invention is to provide a parallel link mechanism and a link actuating device that have a wide operating range while achieving downsizing.

A parallel link mechanism of the present invention comprising:

a proximal end side link hub;

a distal end side link hub; and three or more link mechanisms which couples the distal end side link hub to the proximal end side link hub such that a posture of the distal end side link hub can be changed relative to the proximal end side link hub, wherein each of the link mechanisms includes: a proximal side end link member rotatably coupled at one end thereof to the proximal end side link hub; a distal side end link member rotatably coupled at one end thereof to the distal end side link hub; and a center link member rotatably coupled at both ends thereof to other ends of the proximal and distal side end link members, when at least a central axis of a revolute pair section of the proximal side end link member and the center link member and a central axis of the proximal end side link hub or a central axis of a revolute pair section of the distal side end link member and the center link member and a central axis of the distal end side link hub coincide with each other, a singular point occurs, an angle formed by the central axis of the revolute pair section of the center link member and the proximal side end link member and the central axis of the revolute pair section of the center link member and the distal side end link member is an axis angle $\gamma$ of the center link member, and the axis angle $\gamma$ of the center link member is set such that a posture in which the singular point occurs is avoided.

Here, the "singular point" refers to a structurally uncontrollable posture. A singular point in a general vertical articulated robot refers to a posture in which multiple arms are aligned in a straight line.

With this configuration, the proximal end side link hub, the distal end side link hub, and the three or more link mechanisms form a two-degrees-of-freedom mechanism in which the distal end side link hub is rotatable about two mutually orthogonal axes, relative to the proximal end side link hub. In other words, the proximal end side link hub, the distal end side link hub, and the three or more link mechanisms form a mechanism that allows the distal end side link hub to rotate with two degrees of freedom to change its posture, relative to the proximal end side link hub. This two-degrees-of-freedom mechanism is compact in size, and also, can achieve a wide range of movement for the distal end side link hub relative to the proximal end side link hub.

In the parallel link mechanism, a singular point occurs when at least "the central axis of the revolute pair section of the proximal side end link member and the center link member and the central axis of the proximal end side link hub" or "the central axis of the revolute pair section of the distal side end link member and the center link member and the central axis of the distal end side link hub" coincide with each other. Since the posture in which the singular point occurs becomes clear as described above, the parallel link mechanism can be realized with a wider operating range than in the conventional art, by setting the axis angle $\gamma$ of the center link member such that the posture in which the singular point occurs is avoided. Thus, the posture of the parallel link mechanism can be changed smoothly and at high speed, just like a human wrist. In addition, since the posture in which the singular point occurs becomes clear, the parallel link mechanism can be freely designed such that no singular point occurs within the operating range of the parallel link mechanism. In other words, the parallel link mechanism can be realized with a higher degree of freedom in design than in the conventional art.

When a maximum bending angle which is a maximum value of a bending angle between the central axis of the proximal end side link hub and the central axis of the distal end side link hub is denoted by θmax, a relational expression of $(\gamma/2+\theta max/2)<90$ may be satisfied. In this case, no singular point occurs within the operating range of the parallel link mechanism, and smooth motion can be achieved within the operating range. Since there is no singular point within the operating range, the parallel link mechanism does not move in an unexpected direction and does not generate a large load during operation, thus improving durability.

The maximum bending angle θmax which is the maximum value of the bending angle between the central axis of the proximal end side link hub and the central axis of the distal end side link hub may be 90° or larger. Although it has only been possible to perform work in a hemispherical direction, a wider operating range can be achieved without causing a singular point to occur within the operating range, by setting the maximum bending angle θmax to 90° or larger.

The axis angle γ may be 90° or smaller. In this case, the maximum bending angle θmax can be 90° or larger.

A link actuating device of the present invention includes: the parallel link mechanism of the present invention; and a posture control actuator provided at each of two or more link mechanisms of the three or more link mechanisms in the parallel link mechanism and configured to arbitrarily control the posture of the distal end side link hub. Therefore, the above-described effects of the parallel link mechanism of the present invention are achieved. In addition, there is no need to generate a motion pattern so as to avoid the singular point, and teaching work, etc., can be easily performed even by a non-skilled operator.

The link actuating device may include a rotation angle limiter for limiting rotation angles of the posture control actuators in accordance with values of the axis angle γ and the maximum bending angle θmax of the parallel link mechanism. In this case, the singular point can be easily avoided.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

First Embodiment

A parallel link mechanism according to a first embodiment of the present invention will be described with reference to FIG. 1 to FIG. 6.

Figure 1:
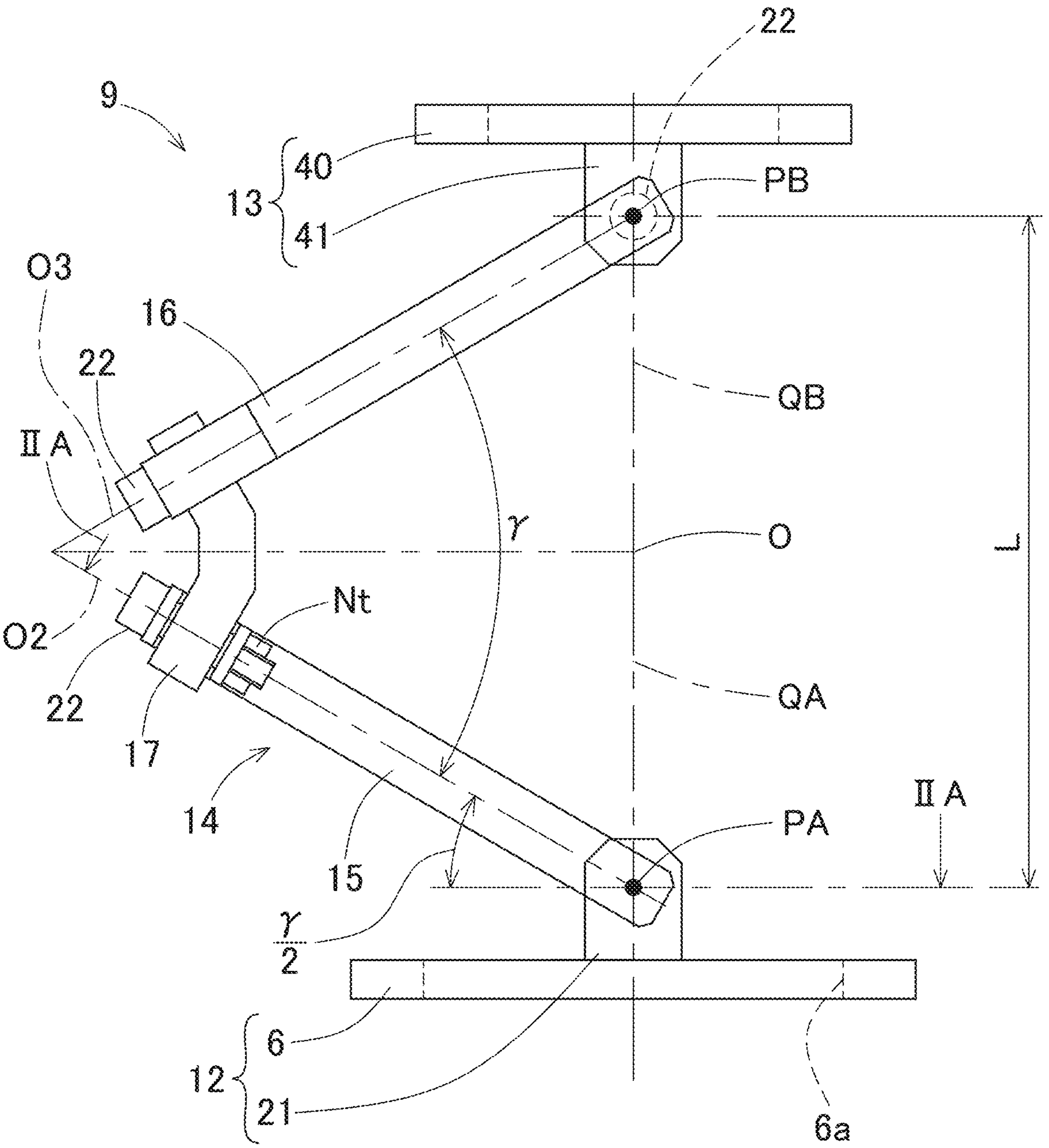
FIG. 1 is a front view of a parallel link mechanism according to a first embodiment of the present invention, wherein a part thereof is omitted.

As shown in FIG. 1, a parallel link mechanism 9 couples a distal end side link hub 13 to a proximal end side link hub 12 via three link mechanisms 14 such that the posture of the distal end side link hub 13 can be changed relative to the proximal end side link hub 12. The number of link mechanisms 14 may be four or more. In FIG. 1, only one link mechanism 14 is shown, and the other two link mechanisms are omitted.

Each link mechanism 14 includes a proximal side end link member 15, a distal side end link member 16, and a center link member 17, and forms a quadric chain link mechanism composed of four revolute pairs. The proximal and distal side end link members 15 and 16 have an L-shape (FIG. 2A), and are rotatably coupled at one end thereof to the proximal end side link hub 12 and the distal end side link hub 13, respectively. The other ends of the proximal and distal side end link members 15 and 16 are rotatably coupled to both ends of the center link member 17, respectively.

The parallel link mechanism 9 is structured by combining two spherical link mechanisms 9*a* and 9*b*. The central axes of each revolute pair section of the proximal end side link hub 12 and the proximal side end link member 15 and each revolute pair section of the proximal side end link member 15 and the center link member 17 intersect each other at a proximal end side spherical link center PA. Similarly, the central axes of each revolute pair section of the distal end side link hub 13 and the distal side end link member 16 and each revolute pair section of the distal side end link member 16 and the center link member 17 intersect each other at a distal end side spherical link center PB.

The distance between the center of the revolute pair section of the proximal end side link hub 12 and the proximal side end link member 15 and the proximal end side spherical link center PA is the same. The distance between the center of the revolute pair section of the proximal side end link member 15 and the center link member 17 and the proximal end side spherical link center PA is the same. Similarly, the distance between the center of the revolute pair section of the distal end side link hub 13 and the distal side end link member 16 and the distal end side spherical link center PB is the same. The distance between the center of the revolute pair section of the distal side end link member 16 and the center link member 17 and the distal end side spherical link center PB is the same. In the parallel link mechanism 9, an axis angle γ of the center link member 17 is specified as 60°. Here, the "axis angle γ" is an angle formed by the central axis O2 of the revolute pair section of the center link member 17 and the proximal side end link member 15 and the central axis O3 of the revolute pair section of the center link member 17 and the distal side end link member 16.

Figure 2A:
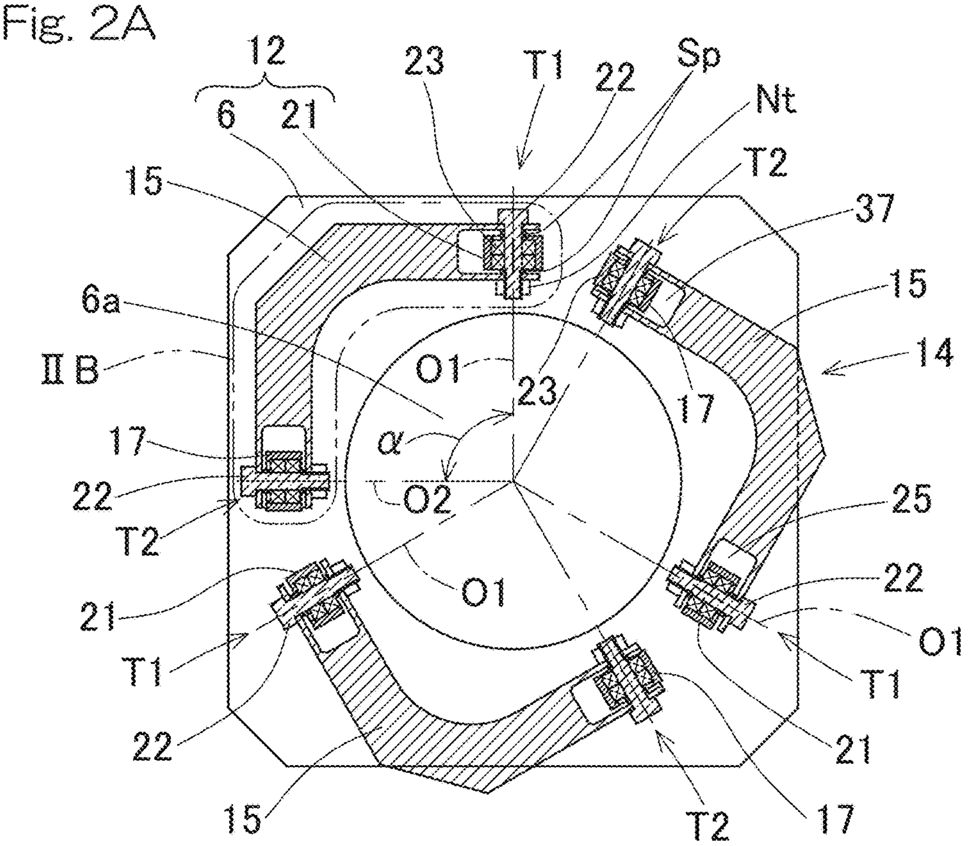
FIG. 2A is a partial cross-sectional view of FIG. 1 taken along a line IIA-IIA.

FIG. 2A shows the revolute pair section T1 of the proximal end side link hub 12 and the proximal side end link member 15 and the revolute pair section T2 of the proximal side end link member 15 and the center link member 17. The revolute pair section T3 of the distal side end link member 16 and the center link member 17 shown in FIG. 3 has the same shape as the revolute pair section T2 shown in FIG. 2B in an enlarged manner. The revolute pair section T4 of the distal end side link hub 13 and the distal side end link member 16 shown in FIG. 3 has the same shape as the revolute pair section T1 shown in FIG. 2B in an enlarged manner.

As shown in FIG. 2A, an angle (arm angle) a formed by the central axis O1 of each revolute pair section T1 of the proximal end side link hub 12 and the proximal side end link member 15 and the central axis O2 of each revolute pair section T2 of the proximal side end link member 15 and the center link member 17 is, for example, 90°. However, the angle (arm angle) α may be other than 90°.

Figure 3:
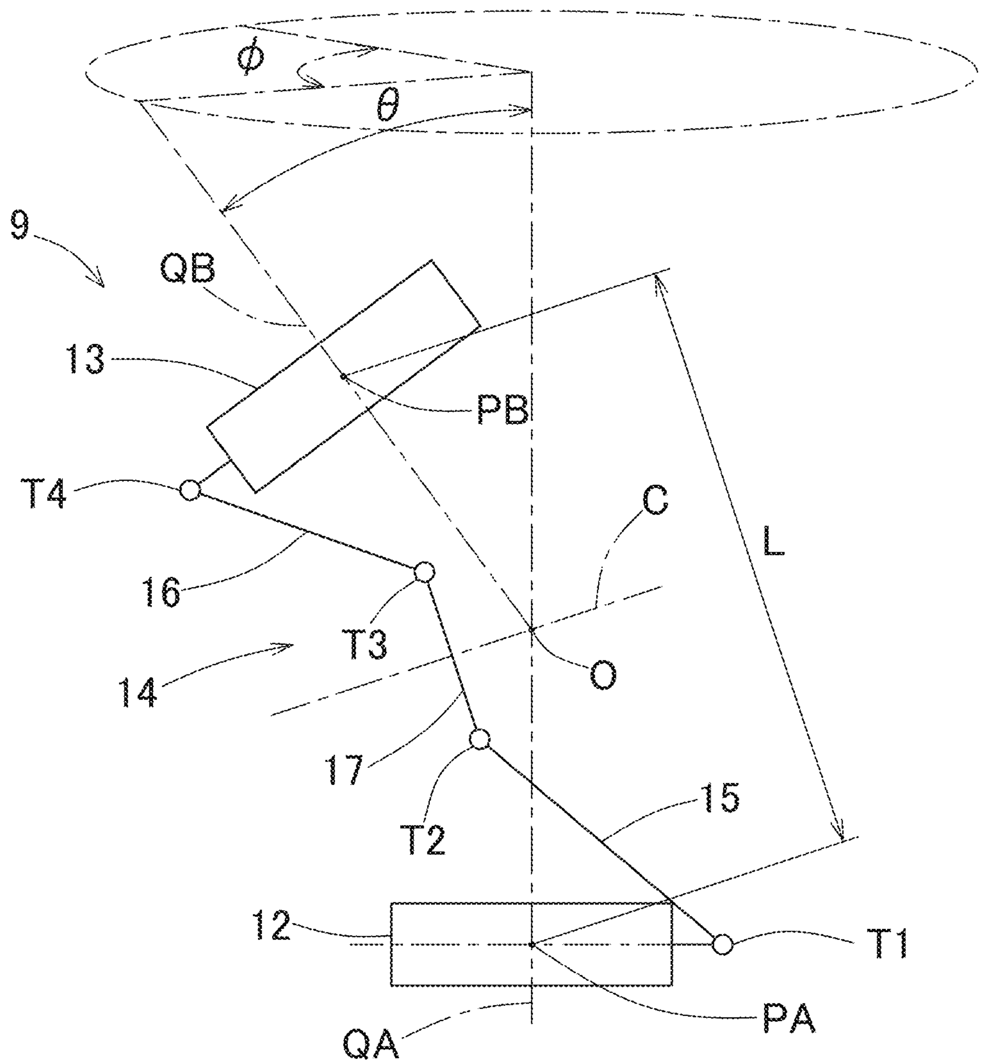
FIG. 3 is a diagram representing one link mechanism of the parallel link mechanism with straight lines.

The three link mechanisms 14 have a geometrically identical configuration. The geometrically identical configuration means that, as shown in FIG. 3, a geometric model depicted with straight lines representing the link members 15, 16, and 17, that is, a model depicted with the revolute pair sections T1, T2, T3, and T4 and straight lines connecting these revolute pair sections T1, T2, T3, and T4, represents a shape in which the proximal end side portion thereof and the distal end side portion thereof are symmetrical with each other with respect to the center portion of the center link member 17 in any posture. The revolute pair sections T1, T2, T3, and T4 are sometimes referred to as each revolute pair section T1, etc., in the following description.

FIG. 3 is a diagram representing one link mechanism 14 with straight lines. The parallel link mechanism 9 of this embodiment is of a rotation symmetry type in which the positional relationship between a proximal end side portion including the proximal end side link hub 12 and the proximal side end link member 15 and a distal end side portion including the distal end side link hub 13 and the distal side end link member 16 is in rotation symmetry relative to a center line C of the center link member 17.

The proximal end side link hub 12, the distal end side link hub 13, and the three link mechanisms 14 form a two-degrees-of-freedom mechanism in which the distal end side link hub 13 is rotatable about two mutually orthogonal axes, relative to the proximal end side link hub 12. In other words, the proximal end side link hub 12, the distal end side link hub 13, and the three link mechanisms 14 form a mechanism that allows the distal end side link hub 13 to rotate with two degrees of freedom to change its posture, relative to the proximal end side link hub 12. This two-degrees-of-freedom mechanism is compact in size, and also, can achieve a wide range of movement for the distal end side link hub 13 relative to the proximal end side link hub 12.

Here, a straight line that passes through the proximal end side spherical link center PA and that intersects the central axis O1 (FIG. 2A) of each revolute pair of the proximal end side link hub 12 and the proximal side end link member 15 at a right angle is defined as a central axis QA of the proximal end side link hub 12. Similarly, a straight line that passes through the distal end side spherical link center PB and that intersects the central axis O1 (FIG. 2A) of each revolute pair of the distal end side link hub 13 and the distal side end link member 16 at a right angle is defined as a central axis QB of the distal end side link hub 13.

In this case, a vertical angle at which the central axis QB of the distal end side link hub 13 is inclined relative to the central axis QA of the proximal end side link hub 12 is referred to as bending angle θ. The maximum value of the bending angle θ is referred to as maximum bending angle θmax. In the parallel link mechanism 9 of the present embodiment, the maximum bending angle θmax is set to 90° or larger as described later. In addition, a turning angle φ of the distal end side link hub 13 relative to the proximal end side link hub 12 can be set within the range of 0° to 360°. The turning angle φ is a horizontal angle at which the central axis QB of the distal end side link hub 13 is inclined relative to the central axis QA of the proximal end side link hub 12.

The posture of the distal end side link hub 13 relative to the proximal end side link hub 12 is changed with a point of intersection O of the central axis QA of the proximal end side link hub 12 and the central axis QB of the distal end side link hub 13 as a rotation center. FIG. 1 shows a state where the central axis QA of the proximal end side link hub 12 and the central axis QB of the distal end side link hub 13 are on the same line. FIG. 3 shows a state where the central axis QB takes a certain operating angle (bending angle) with respect to the central axis QA. Even if the posture of the distal end side link hub 13 relative to the proximal end side link hub 12 is changed, a distance L between the proximal and distal end side spherical link centers PA and PB does not change.

Figure 4:
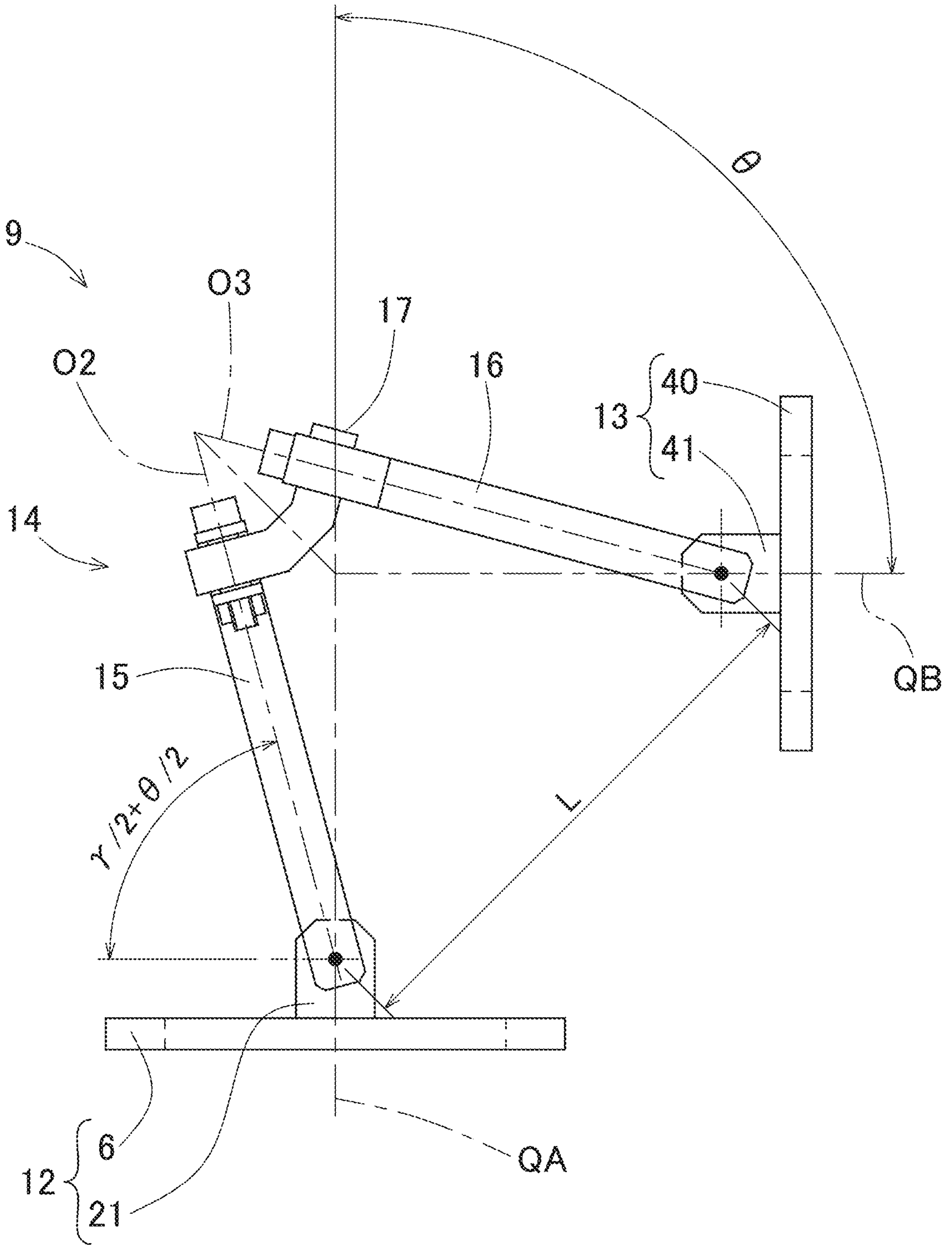
FIG. 4 is a front view showing a different posture of the parallel link mechanism.

As shown in FIG. 1, in the origin posture (bending angle θ=90°) of the parallel link mechanism 9, an angle of a proximal end member 6 described later, with respect to the proximal side end link member 15, is γ/2. As the bending angle θ increases, an angle of the proximal side end link member 15 with respect to the proximal end side link hub 12 increases, reaching a maximum of (γ/2+θ/2), as shown in FIG. 4. When the maximum bending angle of the parallel link mechanism 9 is denoted by θmax, the angle of the proximal side end link member 15 with respect to the proximal end side link hub 12 is (γ/2+θmax/2).

Figure 5:
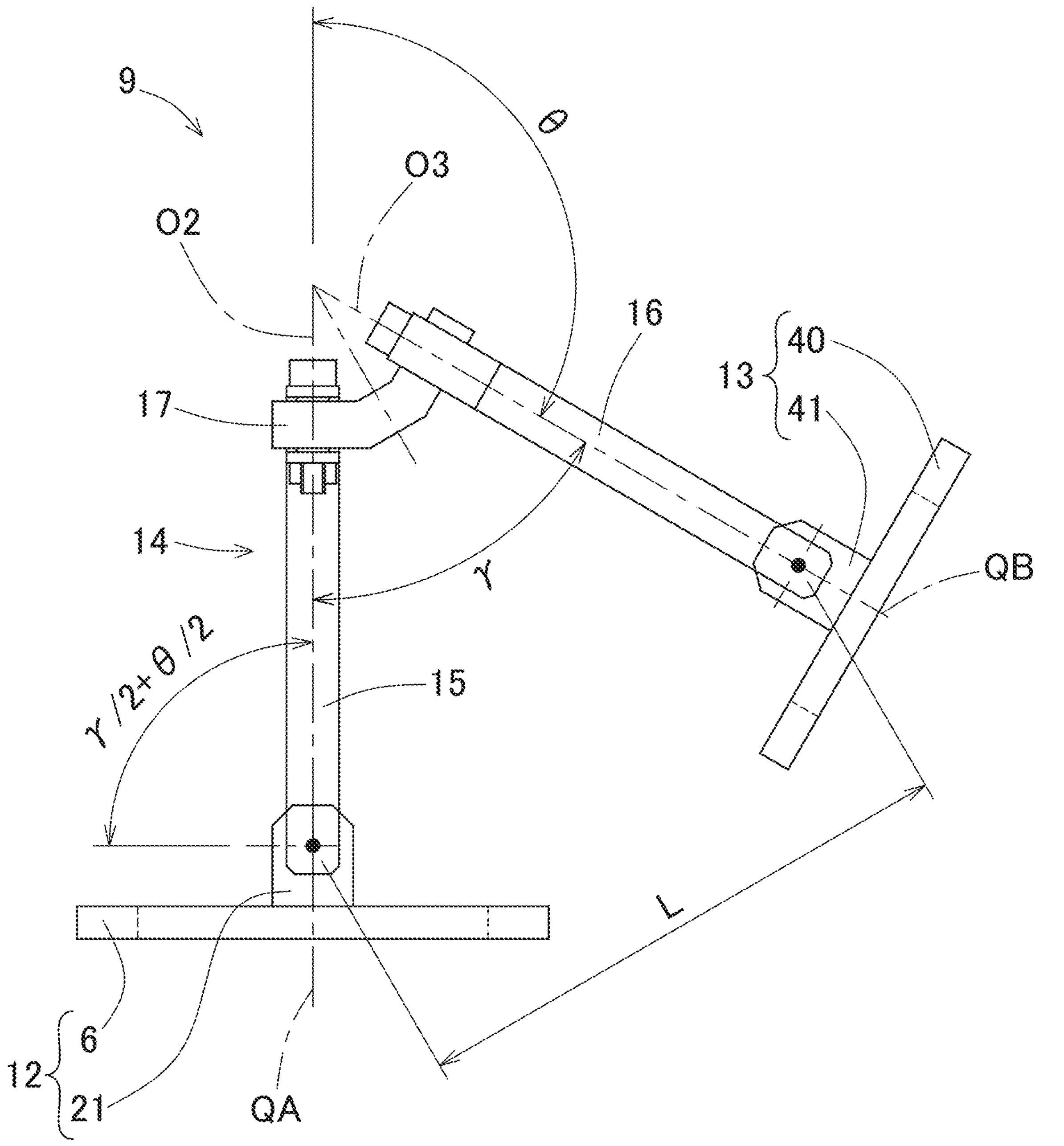
FIG. 5 is a front view showing a posture of the parallel link mechanism at a singular point.

The parallel link mechanism 9 has a singular point in a posture in which "the central axis QA of the proximal end side link hub 12 and the central axis O2 which is the rotation axis of the revolute pair section of the proximal side end link member 15 and the center link member 17" coincide with each other or a posture in which "the central axis QB of the distal end side link hub 13 and the central axis O3 which is the rotation axis of the revolute pair section of the distal side end link member 16 and the center link member 17" coincide with each other, as shown in FIG. 5. Here, the "singular point" refers to a structurally uncontrollable posture such as a posture in which multiple arms are aligned in a straight line in a general vertical articulated robot.

In FIG. 5, both "the central axis QA and the central axis O2" and "the central axis QB and the central axis O3" coincide with each other, but in a posture in which at least "the central axis QA and the central axis O2" or "the central axis QB and the central axis O3" coincide with each other, the parallel link mechanism 9 has a singular point.

Figure 6:
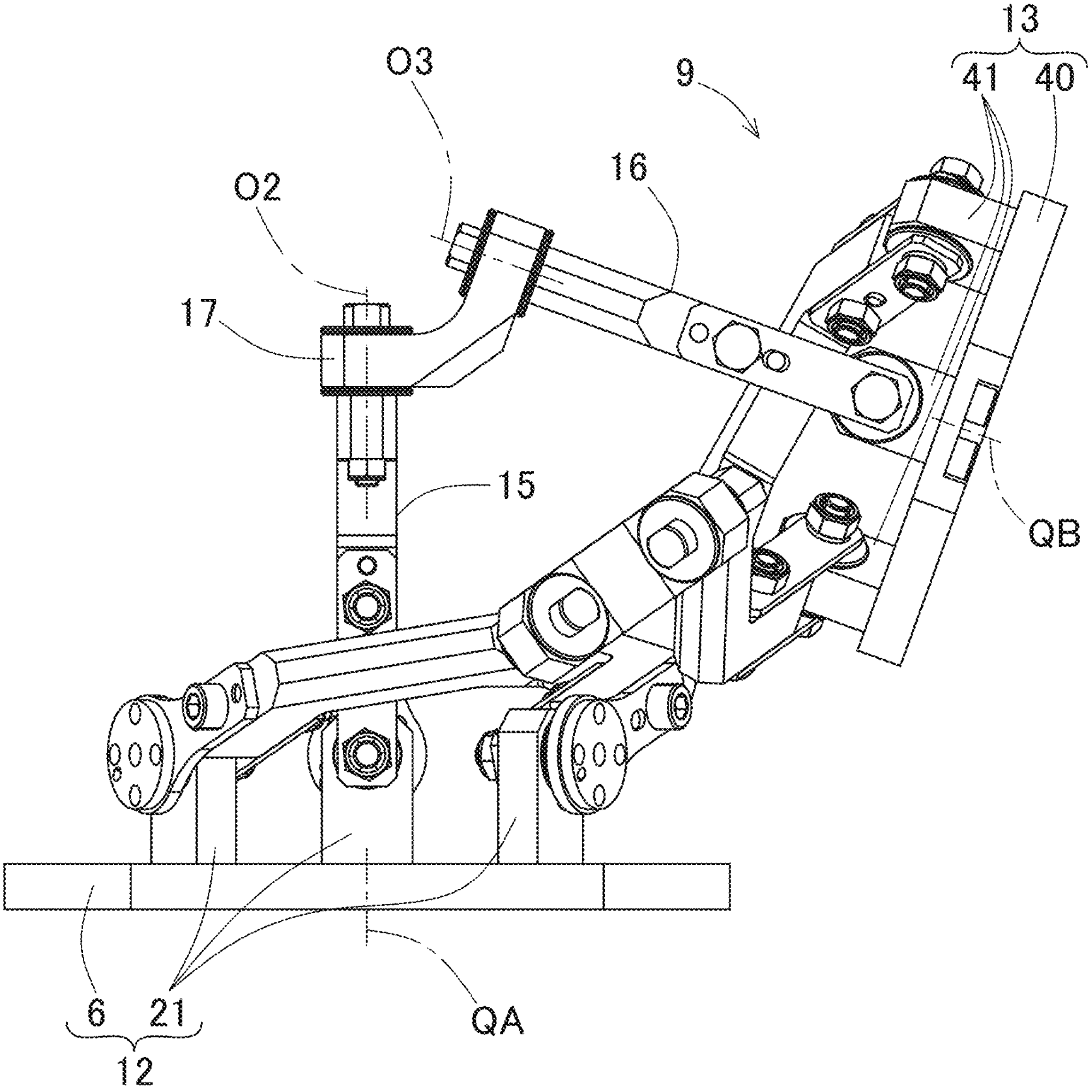
FIG. 6 is a perspective view of a 3D model showing the posture of the parallel link mechanism at the singular point.

The parallel link mechanism 9 cannot be structurally controlled when reaching a singular point as shown in FIG. 6. For example, if an attempt to return the parallel link mechanism 9 to the original position is made after the singular point shown in FIG. 6 is reached, the distal end side link hub 13 or the proximal end side link hub 12 may move in the opposite direction, thereby breaking the symmetry of the parallel link mechanism 9.

Therefore, in the parallel link mechanism 9, the axis angle γ of the center link member 17 is specified such that the posture in which the singular point shown in FIG. 5 occurs is avoided. The posture in which the parallel link mechanism 9 reaches the singular point is the position at which the proximal side end link member 15 of one link mechanism 14 out of the multiple link mechanisms 14 is at 90° with respect to the proximal end side link hub 12, that is, the posture in which the central axis QA of the proximal end side link hub 12 and the central axis O2 which is the rotation axis of the revolute pair section of the proximal side end link member 15 and the center link member 17 coincide with each other.

Alternatively, the posture in which the parallel link mechanism 9 reaches the singular point is the position at which the distal side end link member 16 of one link mechanism 14 out of the multiple link mechanisms 14 is at 90° with respect to the distal end side link hub 13, that is, the posture in which the central axis QB) of the distal end side link hub 13 and the central axis O3 which is the rotation axis of the revolute pair section of the distal side end link member 16 and the center link member 17 coincide with each other.

Therefore, the axis angle γ and the maximum bending angle θmax are preferably determined such that (γ/2+θmax/2) is less than 90°. That is, if the parallel link mechanism 9 satisfies the following formula (1), the parallel link mechanism 9 does not have a singular point. In this case, no singular point occurs within the operating range of the parallel link mechanism 9, and smooth motion can be achieved within the operating range. Since there is no singular point within the operating range, the parallel link mechanism 9 does not move in an unexpected direction and does not generate a large load during operation, thus improving durability.

$$(\gamma/2 \pm \theta\text{max}/2) < 90 \qquad \text{Formula (1)}$$

When it comes to designing, the axis angle γ and the maximum bending angle θmax are preferably determined with a safety factor of 10% or more, and it is preferable that the parallel link mechanism 9 satisfies the following formula (2). In formula (2), L1 denotes the safety factor. The safety factor L1 is determined by either or both of testing and simulation.

$$(\gamma/2 \pm \theta\text{max}/2) \times L1 < 90 \qquad \text{Formula (2)}$$

In the present embodiment, since γ=60°, if the maximum bending angle θmax is set to be less than 120°, no singular point occurs, and unlike conventional parallel link mechanisms, a maximum bending angle θmax of 90° or larger can be achieved. When it comes to designing, the maximum bending angle θmax is preferably 103.6° or smaller in consideration of the safety factor.

As shown in FIG. 1, the proximal end side link hub 12 includes a flat plate-shaped proximal end member 6 and three rotation shaft coupling members 21 (FIG. 2A) provided so as to be integrated with the proximal end member 6. The proximal end member 6 shown in FIG. 2A has a circular through hole 6*a* defined in a center portion thereof, and the three rotation shaft coupling members 21 are placed equidistantly in the circumferential direction around the through hole 6*a*. The center of the through hole 6*a* is located on the central axis QA (FIG. 1) of the proximal end side link hub 12.

Figure 2B:
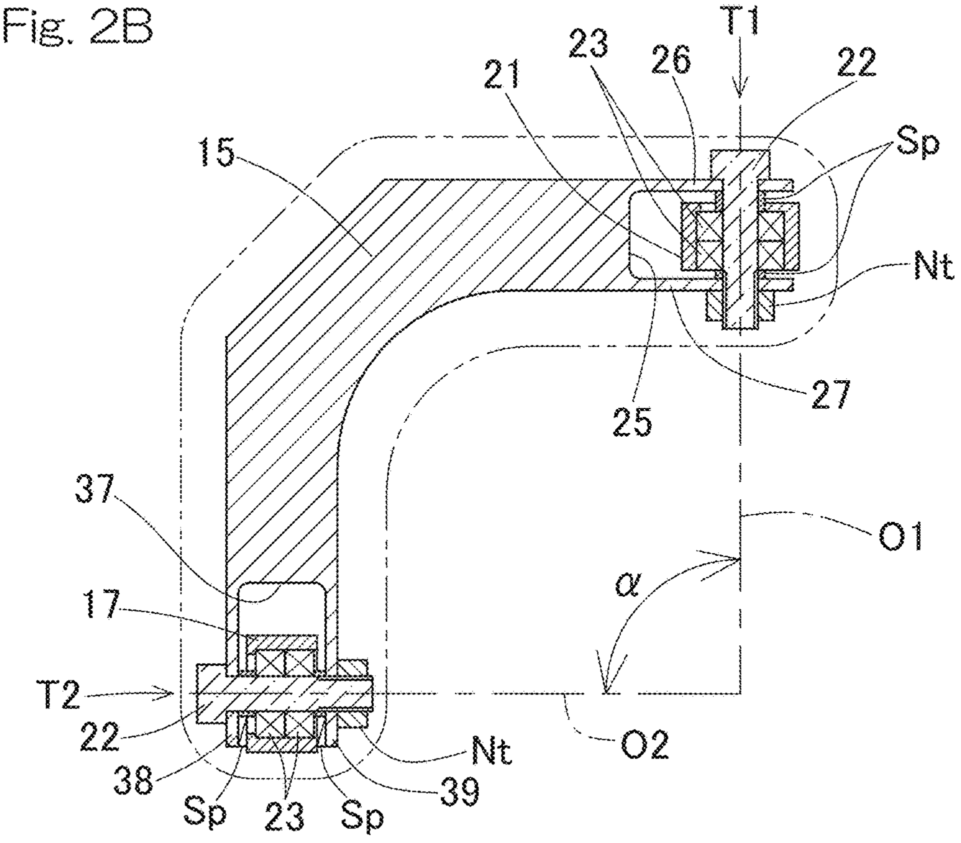
FIG. 2B is a partially enlarged view of a part IIB in FIG. 2A.

A bearing 23 is provided in each revolute pair section T1, etc. As shown in FIG. 2B, in the revolute pair section T1 of the proximal end side link hub 12 (FIG. 2A) and the proximal side end link member 15, a rotation shaft 22 is rotatably coupled to each rotation shaft coupling member 21 via the bearing 23. The axis of the rotation shaft 22 intersects the central axis QA (FIG. 1) of the proximal end side link hub 12. One end of the proximal side end link member 15 is coupled to the rotation shaft 22 such that the proximal side end link member 15 rotates together with the rotation shaft 22.

The rotation shaft 22 is rotatably supported by the rotation shaft coupling member 21 via two bearings 23 at an axially intermediate small-diameter portion thereof. The two bearings 23 are fixed in a state where the outer circumferences of outer rings thereof are fitted into a radially inner groove provided in the rotation shaft coupling member 21. The type and installation method for the bearings provided in the other revolute pair sections T2, T3, and T4 (FIG. 3) are substantially the same as above.

A cut portion 25 is formed at the one end of the proximal side end link member 15, and portions on both sides of the cut portion 25 form a pair of inner and outer rotation shaft support portions 27 and 26. Through holes are formed in the pair of rotation shaft support portions 27 and 26, respectively. The rotation shaft coupling member 21 is placed in the cut portion 25, and the small-diameter portion of the rotation shaft 22 is inserted into the through holes and the inner ring inner circumferential surfaces of the bearings 23. An external thread portion formed at an axial end of the rotation shaft 22 protrudes inward (lower side in FIG. 2B) from the inner rotation shaft support portion 27. A nut Nt is screwed onto the external thread portion. A spacer Sp is interposed between the inner rotation shaft support portion 27 and an inner ring end face facing the rotation shaft support portion 27, and a spacer Sp is interposed between the outer rotation shaft support portion 26 and an inner ring end face facing the rotation shaft support portion 26. Therefore, a preload is applied to the bearings 23 when the nut Nt is screwed.

A rotation shaft 22 is coupled to the revolute pair section T2 of the proximal side end link member 15 and the center link member 17 via bearings 23 at one end of the center link member 17. That is, the rotation shaft 22 rotatably coupled to the one end of the center link member 17 is coupled to the other end of the proximal side end link member 15. The rotation shaft 22 is rotatably supported by the one end of the center link member 17 via the two bearings 23 at a small-diameter portion thereof. A cut portion 37 is formed at the other end of the proximal side end link member 15, and portions on both sides of the cut portion 37 form a pair of inner and outer rotation shaft support portions 39 and 38. Through holes are formed in the pair of rotation shaft support portions 39 and 38, respectively.

The one end of the center link member 17 is placed in the cut portion 37, and the small-diameter portion is inserted into the through holes and the inner ring circumferential surfaces of the bearings 23. Furthermore, a nut Nt is screwed on an external thread portion of the rotation shaft 22. Spacers Sp, Sp are interposed between inner ring end faces of the bearings 23 and the pair of rotation shaft support portions 39 and 38, and a preload is applied to the bearings 23 when the nut Nt is screwed.

As shown in FIG. 1, the distal end side link hub 13 includes a flat plate-shaped distal end member 40 and three rotation shaft coupling members 41 provided equidistantly in the circumferential direction on a bottom surface of the distal end member 40. The center of the circumference, on which each rotation shaft coupling member 41 is placed, is located on the central axis QB of the distal end side link hub 13. A rotation shaft 22 whose axis intersects the central axis QB of the distal end side link hub 13 is rotatably coupled to each rotation shaft coupling member 41. The one end of the distal side end link member 16 is coupled to the rotation shaft 22. The rotation shaft 22 is rotatably coupled to the other end of the center link member 17 and is coupled to the other end of the distal side end link member 16.

A rotation shaft 22 is rotatably coupled to the revolute pair section T4 (FIG. 3) of the distal end side link hub 13 and the distal side end link member 16 via two bearings provided at each rotation shaft coupling member 41. A rotation shaft 22 is rotatably coupled to the revolute pair section T3 (FIG. 3) of the distal side end link member 16 and the center link member 17 via two bearings provided at the other end of the center link member 17.

<Function Effects>

In the parallel link mechanism 9 described above, the proximal end side link hub 12, the distal end side link hub 13, and the three or more link mechanisms 14 form a two-degrees-of-freedom mechanism in which the distal end side link hub 13 is rotatable about two mutually orthogonal axes, relative to the proximal end side link hub 12. In other words, the proximal end side link hub 12, the distal end side link hub 13, and the three or more link mechanisms 14 form a mechanism that allows the distal end side link hub 13 to rotate with two degrees of freedom to change its posture, relative to the proximal end side link hub 12. This two-degrees-of-freedom mechanism is compact in size, and also, can achieve a wide range of movement for the distal end side link hub 13 relative to the proximal end side link hub 12.

As shown in FIG. 5, in the parallel link mechanism 9, a singular point occurs when the central axis QA of the proximal end side link hub 12 and the central axis O2 which is the rotation axis of the revolute pair section of the proximal side end link member 15 and the center link member 17 coincide with each other. In addition, in the parallel link mechanism 9, a singular point occurs when the central axis QB of the distal end side link hub 13 and the central axis O3 which is the rotation axis of the revolute pair section of the distal side end link member 16 and the center link member 17 coincide with each other.

Since the posture in which the singular point occurs becomes clear as described above, the parallel link mechanism 9 can be realized with a wider operating range than in the conventional art, by specifying the axis angle γ of the center link member 17 such that the posture in which the singular point occurs is avoided. Thus, the posture of the parallel link mechanism 9 can be changed smoothly and at high speed, just like a human wrist. In addition, since the posture in which the singular point occurs becomes clear, the parallel link mechanism 9 can be freely designed such that no singular point occurs within the operating range of the parallel link mechanism 9. In other words, the parallel link mechanism 9 can be realized with a higher degree of freedom in design than in the conventional art.

<Link Actuating Device: FIG. 7 to FIG. 9B>

Figure 7:
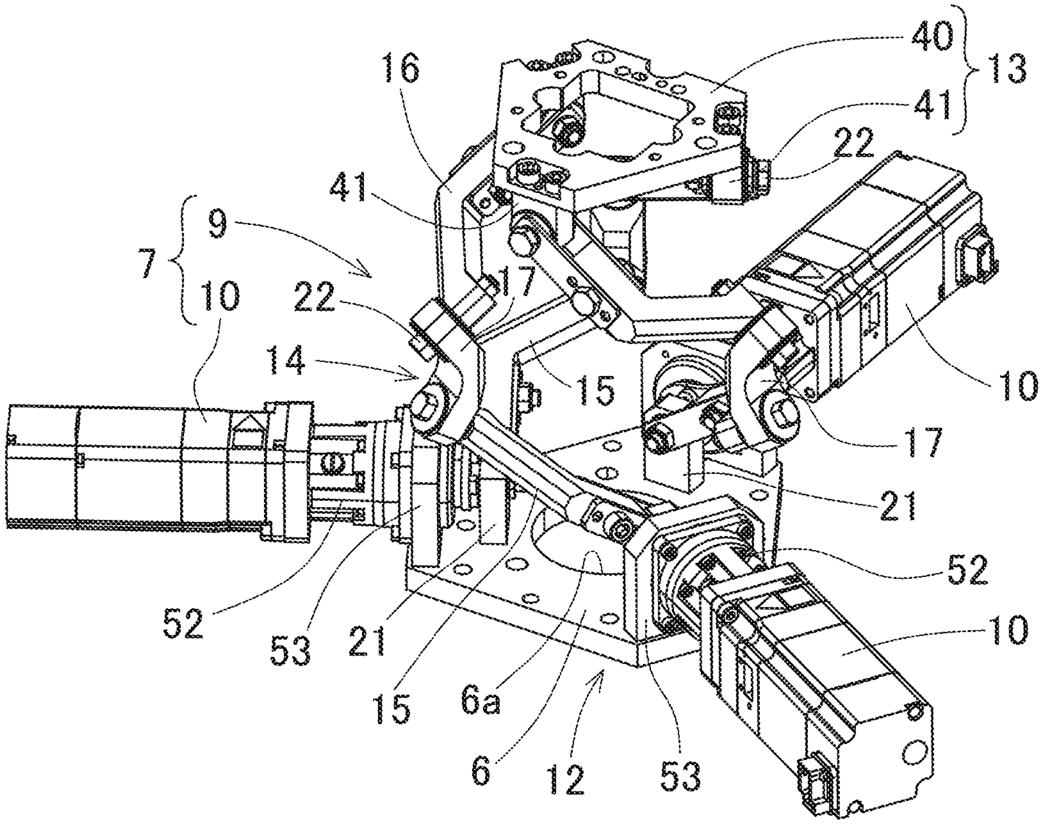
FIG. 7 is a perspective view of a link actuating device including the parallel link mechanism.
Figure 8:
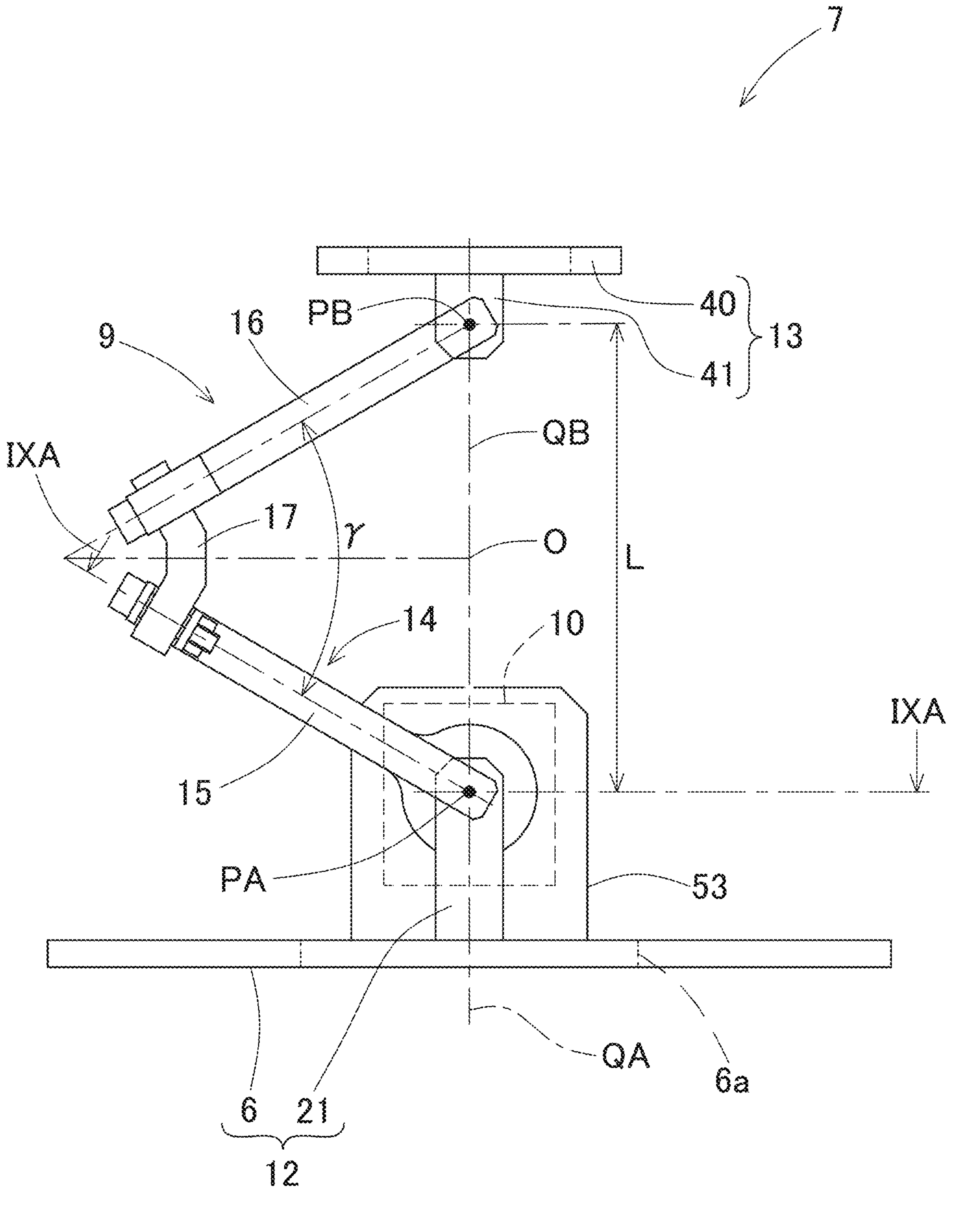
FIG. 8 is a front view of a simplified model of the link actuating device in which two link mechanisms are omitted.
Figure 9A:
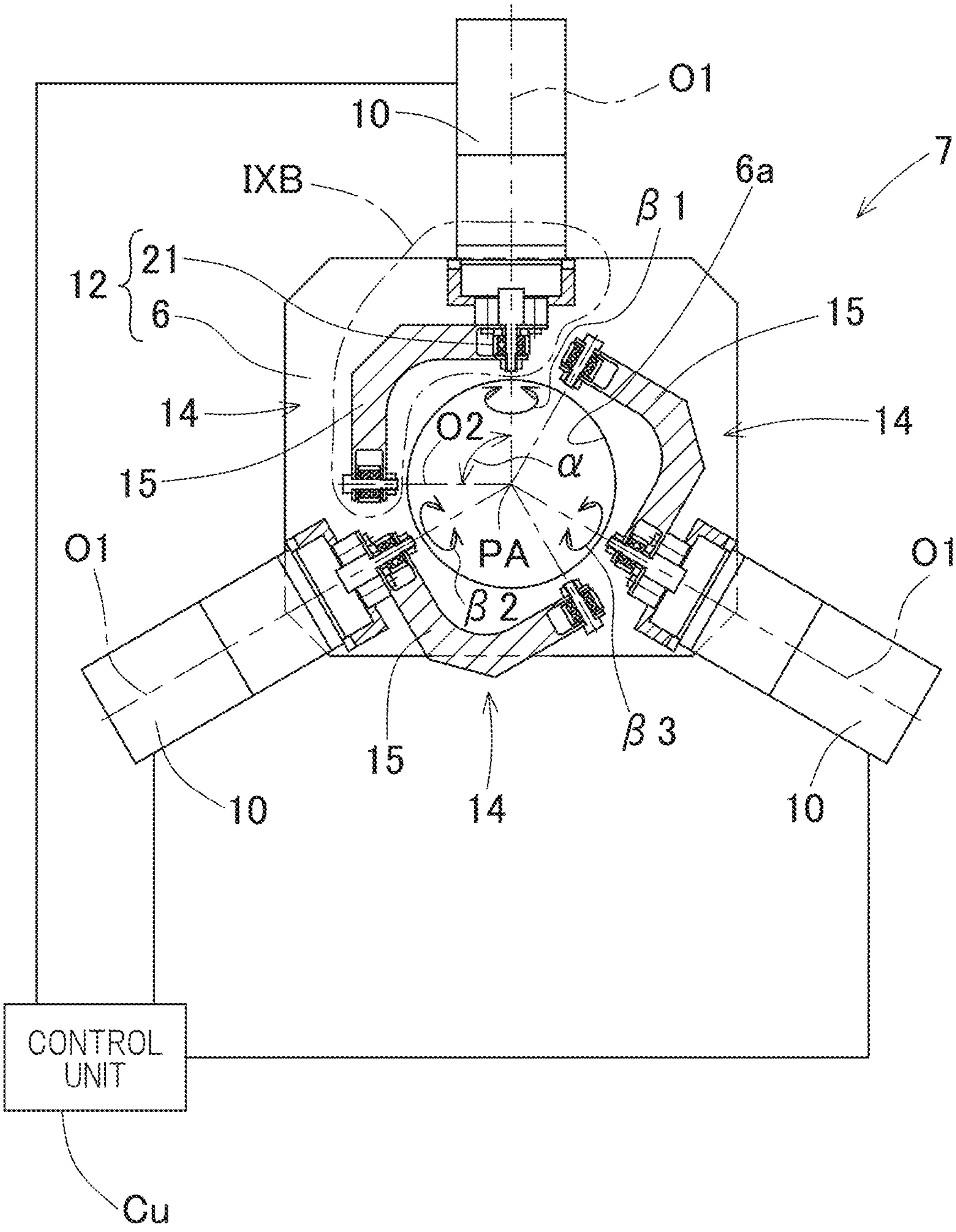
FIG. 9A is a partial cross-sectional view of FIG. 8 taken along a line IXA-IXA.

A link actuating device 7 shown in FIG. 7 includes the parallel link mechanism 9 according to the first embodiment described above, posture control actuators 10 which arbitrarily control the posture of the distal end side link hub 13 of the parallel link mechanism 9, and a control unit Cu in FIG. 9A which controls rotational drive of each posture control actuator 10. Instead of the above-described parallel link mechanism 9, a parallel link mechanism 9A (FIG. 11) of a second embodiment described later may be applied to the link actuating device 7.

<Posture Control Actuator>

In this example, posture control actuators 10 are provided to all of the three link mechanisms 14. Each posture control actuator 10 is a rotary actuator including a speed-reducing mechanism 52 shown in FIG. 9B, and is installed on the surface of the proximal end member 6 (FIG. 8) of the proximal end side link hub 12, coaxially with the rotation shaft 22. The posture control actuator 10 is provided integrally with the speed-reducing mechanism 52, and the speed-reducing mechanism 52 is fixed to the proximal end member 6 (FIG. 8) via a motor fixing member 53. If posture control actuators 10 are provided to at least two of the three link mechanisms 14 shown in FIG. 9A, the posture of the distal end side link hub 13 (FIG. 8) relative to the proximal end side link hub 12 can be determined.

<Control Unit>

Figure 9B:
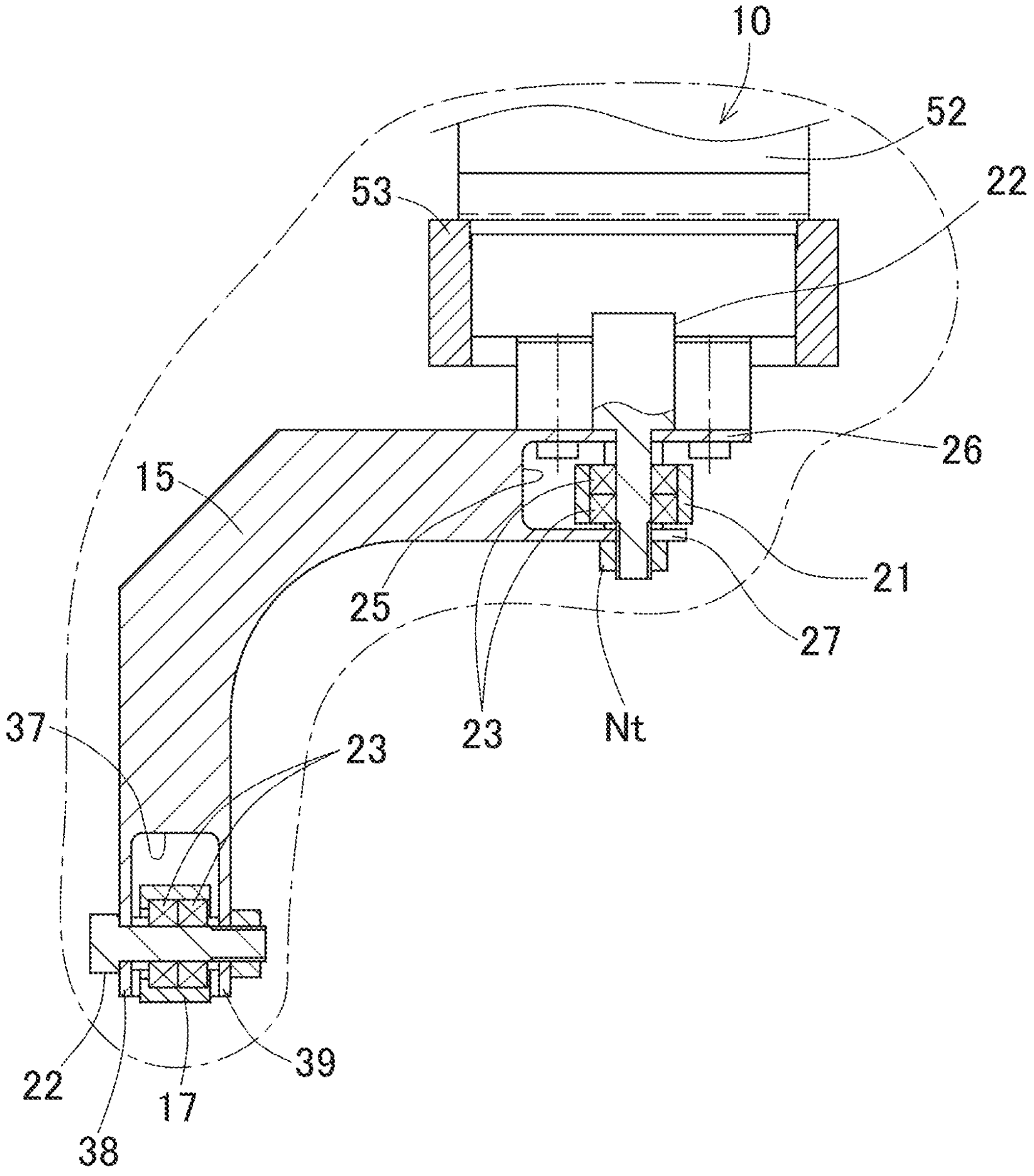
FIG. 9B is a partially enlarged view of a part IXB in FIG. 9A.
Figure 10:
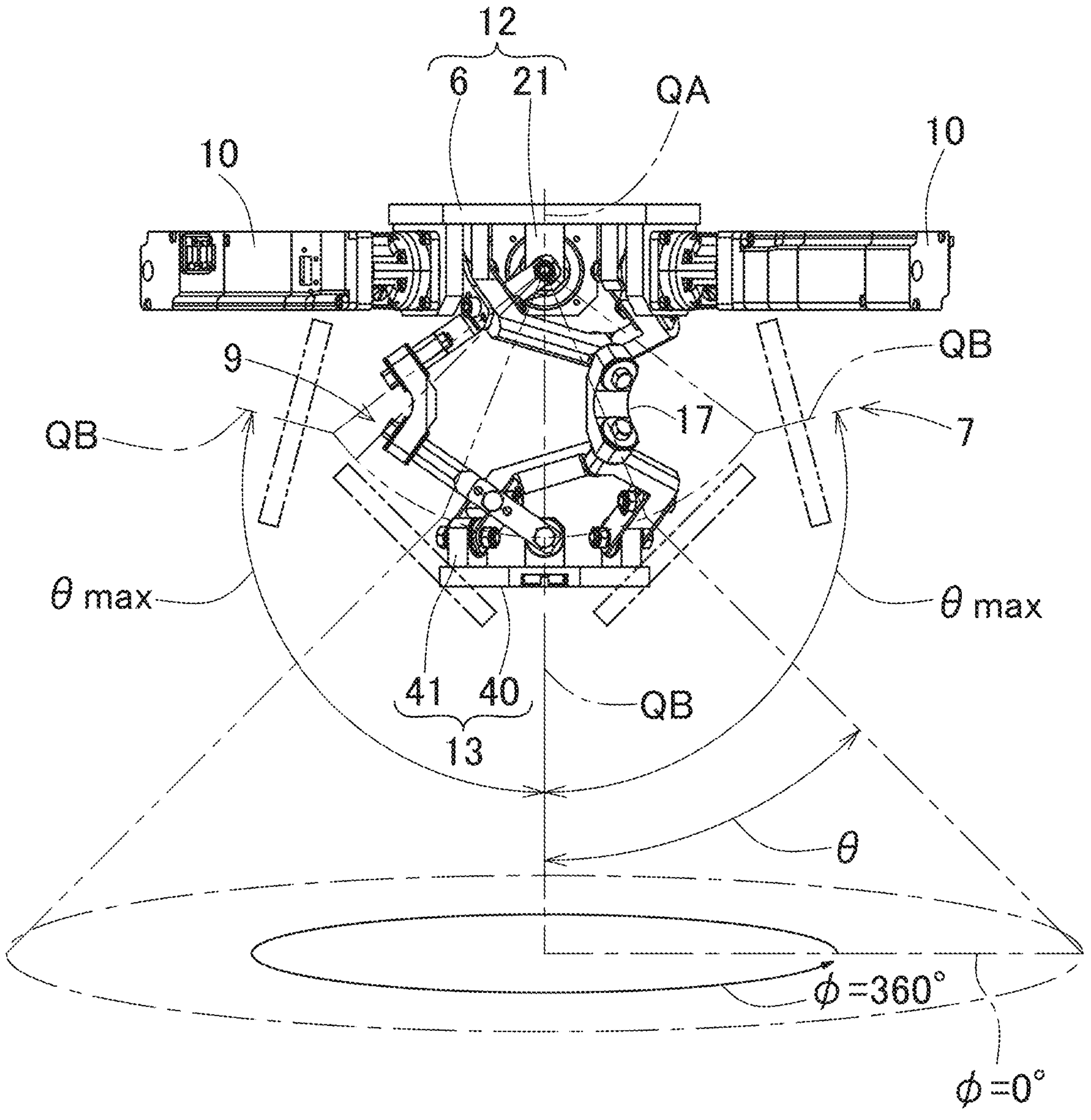
FIG. 10 is a diagram showing a maximum bending angle, etc., of the link actuating device.

The control unit Cu shown in FIG. 9A controls rotational drive of each posture control actuator 10, whereby the rotation thereof is transmitted to the proximal side end link member 15 via the speed-reducing mechanism 52 shown in FIG. 9B while the speed of the rotation is reduced. Accordingly, as shown in FIG. 10, the posture of the distal end side link hub 13 relative to the proximal end side link hub 12 is arbitrarily changed. An end effector (not shown) is attached to the distal end member 40 of the distal end side link hub 13. The end effector is, for example, a hand including a gripper, a nozzle for cleaning, a dispenser, a welding torch, an image processing device, or the like.

As shown in FIG. 9A, the control unit Cu, which is a rotation angle limiter, has a soft limit function of limiting rotation angles β1, β2, and β3 of the respective posture control actuators 10 in accordance with the values of the axis angle γ (FIG. 8) and the maximum bending angle θmax of the parallel link mechanism 9. In this case, the singular point can be easily avoided by a program of the control unit Cu or the like. Accordingly, the cost can be reduced and the link actuating device 7 can be downsized, as compared to, for example, the case where the singular point is avoided by providing a mechanical brake mechanism or the like to the posture control actuator 10.

Other Embodiments

In the following description, parts corresponding to the matters described in the preceding embodiment are designated by the same reference numerals, and the redundant description thereof is omitted. When only a part of a configuration is described, the remaining part of the configuration is the same as that described in the preceding embodiment, unless otherwise specified. The same advantageous effects are achieved by the same configuration. A combination of parts that are specifically described in respective embodiments can be implemented, and, further, embodiments may be partially combined unless such combination causes any problem.

Figure 11:
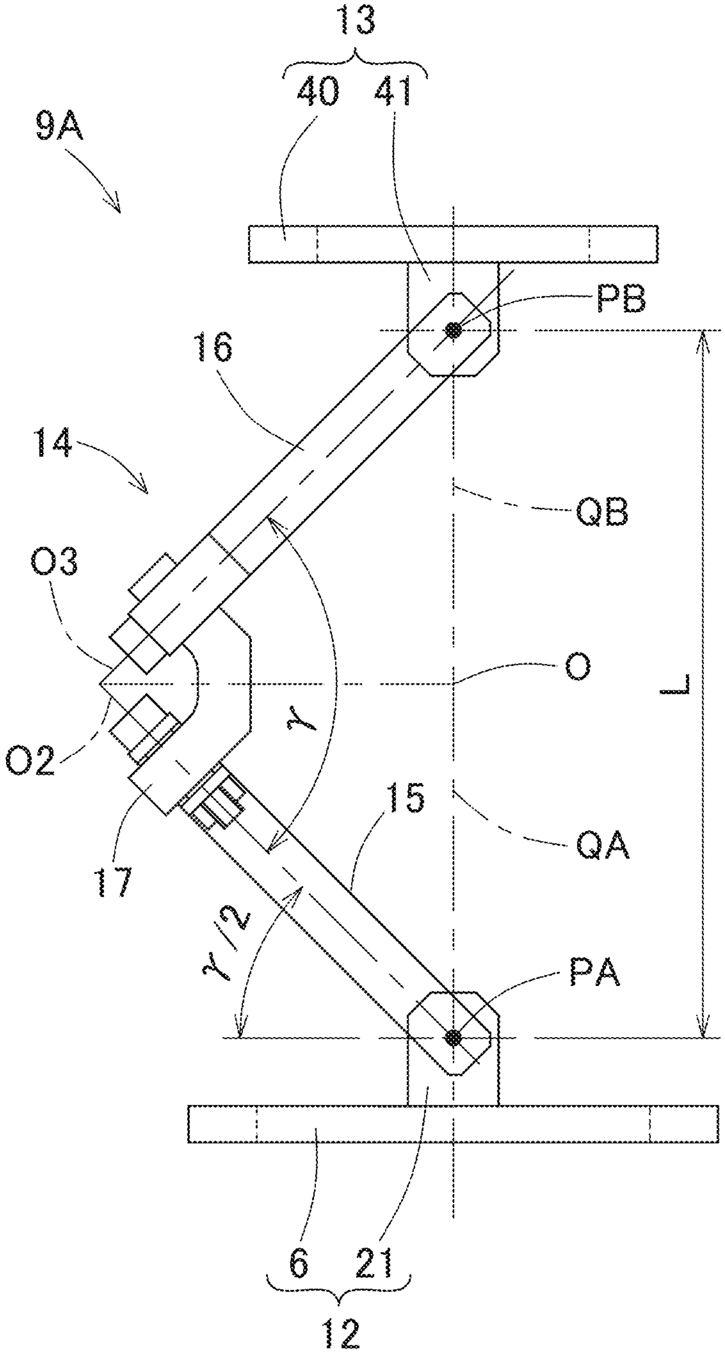
FIG. 11 is a front view of a parallel link mechanism according to a second embodiment of the present invention, wherein a part thereof is omitted.
Figure 12:
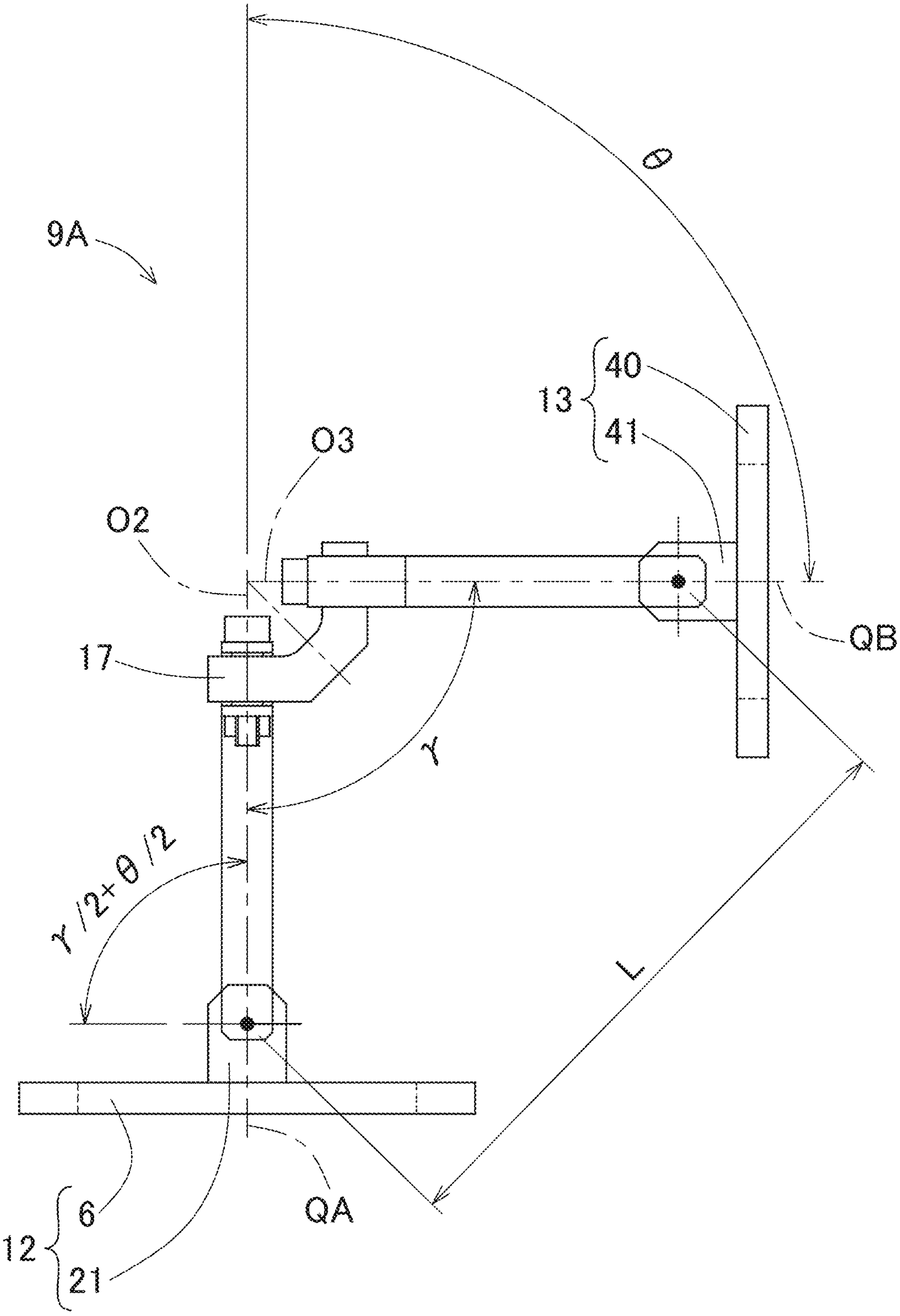
FIG. 12 is a front view showing a posture of the parallel link mechanism at a singular point.

Second Embodiment: FIG. 11 and FIG. 12

The parallel link mechanism 9A having an axis angle γ of 90° as shown in FIG. 11 may be employed. The parallel link mechanism 9A has a singular point at a bending angle θ=90° as shown in FIG. 12, and has a narrower operating range as compared to the first embodiment described above. That is, the operating range of the parallel link mechanism widens as the axis angle γ decreases, and when the axis angle γ is set to 90° or smaller, a parallel link mechanism having a maximum bending angle θmax of 90° or larger can be realized.

As each posture control actuator 10, an actuator equipped with a brake may be used.

As a reference proposal example, it is also possible to cause the center link member, the proximal or distal side end link member, the distal end member, the proximal end member, or the like to interfere with another component before the singular point is reached, thereby preventing the singular point from being reached.

A parallel link mechanism according to this reference proposal example is described as follows:

A parallel link mechanism comprising:

a proximal end side link hub;

a distal end side link hub; and three or more link mechanisms which couples the distal end side link hub to the proximal end side link hub such that a posture of the distal end side link hub can be changed relative to the proximal end side link hub, wherein each of the link mechanisms includes: a proximal side end link member rotatably coupled at one end thereof to the proximal end side link hub; a distal side end link member rotatably coupled at one end thereof to the distal end side link hub; and a center link member rotatably coupled at both ends thereof to other ends of the proximal and distal side end link members, when at least either a central axis of a revolute pair section of the proximal side end link member and the center link member and a central axis of the proximal end side link hub or a central axis of a revolute pair section of the distal side end link member and the center link member and a central axis of the distal end side link hub coincide with each other, a singular point occurs, and at least one of the center link member, the proximal or distal side end link member, the proximal end side link hub, and the distal end side link hub is caused to interfere with another component such that a posture in which the singular point occurs is avoided.

The present invention is not limited to the above-described embodiments, and various additions, changes, or deletions can be made without departing from the gist of the present invention. Therefore, these are construed as included within the scope of the present invention.

REFERENCE NUMERALS

7 . . . link actuating device
9, 9A . . . parallel link mechanism
10 . . . posture control actuator
12 . . . proximal end side link hub
13 . . . distal end side link hub
14 . . . link mechanism
15 . . . proximal side end link member
16 . . . distal side end link member
17 . . . center link member
Cu . . . control unit (rotation angle limiter)

What is claimed is:

1. A link actuating device comprising a parallel link mechanism which includes:

a proximal end side link hub;

a distal end side link hub; and three or more link mechanisms which couple the distal end side link hub to the proximal end side link hub such that a posture of the distal end side link hub is enabled to be changed relative to the proximal end side link hub, wherein each of the three or more link mechanisms includes: a proximal side end link member rotatably coupled at one end thereof to the proximal end side link hub; a distal side end link member rotatably coupled at one end thereof to the distal end side link hub; and a center link member rotatably coupled at both ends thereof to other ends of the proximal side end link member and the distal side end link member, when at least a central axis of a revolute pair section of the proximal side end link member and the center link member and a central axis of the proximal end side link hub or a central axis of a revolute pair section of the distal side end link member and the center link member and a central axis of the distal end side link hub coincide with each other, a singular point occurs, an angle formed by the central axis of the revolute pair section of the center link member and the proximal side end link member and the central axis of the revolute pair section of the center link member and the distal side end link member is an axis angle γ of the center link member, and the axis angle γ of the center link member is set such that a posture in which the singular point occurs is avoided, the link actuating device further comprising:

a posture control actuator provided at each of two or more link mechanisms of the three or more link mechanisms in the parallel link mechanism and configured to arbitrarily control the posture of the distal end side link hub; and a rotation angle limiter for limiting rotation angles of the posture control actuators in accordance with values of the axis angle γ and a maximum bending angle of the parallel link mechanism.

2. The parallel link mechanism as claimed in claim 1, wherein, when the maximum bending angle which is a maximum value of a bending angle between the central axis of the proximal end side link hub and the central axis of the distal end side link hub is denoted by θmax, a relational expression of $(\gamma/2+\theta max/2)<90$ is satisfied.

3. The parallel link mechanism as claimed in claim 1, wherein the maximum bending angle θmax which is the maximum value of the bending angle between the central axis of the proximal end side link hub and the central axis of the distal end side link hub is 90° or larger.

4. The parallel link mechanism as claimed in claim 1, wherein the axis angle $\gamma$ is 90° or smaller.

* * * * *